UNITED STATES PATENT OFFICE 2,067,392

TREATMENT OF UNSATURATED MONOHALIDES

Herbert P. A. Groll, Oakland, and George Hearne, Berkeley, Calif., assignors to Shell Development Company, San Francisco, Calif., a corporation of Delaware No Drawing. Application April 27, 1934,
Serial No. 722,728

17 Claims. (Cl. 260—157)

This invention relates to a novel process for the treatment of unsaturated monohalides of other than the vinyl type, and is more particularly concerned with effecting the reaction of unsaturated monohalides containing at least four carbon atoms to the molecule and one halogen atom attached to a saturated carbon atom, with a hypohalogenous acid, with aqueous solutions of halogen, with solutions of a hypohalogenous acid and a hydrogen halide, or with alkyl or aralkyl hypohalites in the presence of water whereby polyhalogenated hydroxy compounds and/or polyhalogenated hydrocarbons can be prepared.

The unsaturated halides employed in the execution of our process contain at least four carbon atoms and one halogen atom attached to a saturated carbon atom. The unsaturated monohalide may comprise an iso or normal alkyl chain which may or may not be attached to a cyclic radical as of the aromatic, alicyclic, and heterocyclic series, or the chain may comprise an alicyclic structure. Some of the lowest members of the series of unsaturated monohalides adaptable to treatment according to the principles embodied in our invention are the unsaturated halides, which are represented by the probable formulas

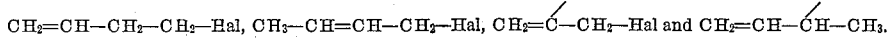

$CH_2=CH-CH_2-CH_2-Hal$, $CH_3-CH=CH-CH_2-Hal$, 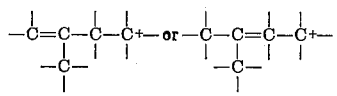 and $CH_2=CH-\overset{Hal}{\overset{|}{CH}}-CH_3$.

An object of our invention is provide a process for effecting the reaction of selected unsaturated monohalides with a hypohalogenous acid or equivalent reactant in such a manner that accompanying side reactions occasioned by the contact of free halogen and/or neutralizing agents with the unsaturated monohalide or with the primary reaction product are obviated, whereby excellent yields of polyhalogenated secondary or tertiary carbinol compounds may be obtained.

In operating with unsaturated monohalides other than vinyl type monohalides, one encounters various species which can be classified in two distinct groups for the purposes of the present invention. These groups may be considered to embrace: (1) those unsaturated monohalides comprising the grouping

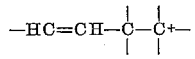

wherein the carbon atom represented by C+ is not of quaternary or tertiary character. This subgroup of unsaturated halides reacts with a hypohalogenous acid or an equivalent reactant according to the principles embodied in our invention whereby polyhalogenated primary or secondary alcohols are obtained. In the case that the carbon atom represented by C+ is of quaternary or tertiary character, and which, may be part of a cyclic radical, the main reaction product is a further halogenated compound obtained by the substitution of halogen for hydrogen in the molecule, and in some cases halogen is also added to the olefinic double bond. (2) Those unsaturated monohalides comprising the grouping $$-\overset{|}{C}=\overset{|}{C}-\overset{|}{\underset{|}{C}}-\overset{|}{C^+}- \text{ or } -\overset{|}{C}-\overset{|}{C}=\overset{|}{\underset{|}{C}}-\overset{|}{C^+}-$$

wherein the carbon atom represented by C+ is not quaternary or tertiary. In operating with this subgroup of monohalides, the main reaction product is a polyhalogenated hydroxy compound. The hydroxyl radical is attached to the tertiary carbon atom and a halogen atom is added to the vicinal unsaturated carbon atom. These products may be regarded as polyhalogenated tertiary alcohols. Where the carbon atom represented by C+ is of quaternary or tertiary character, the main reaction is substitution of halogen whereby further halogenated compounds are obtained.

In executing our invention with any of the above classified unsaturated monohalides we may proceed as follows: the selected subgroup of unsaturated monohalides is caused to react with a hypohalogenous acid or with an aqueous halogen solution or with an alkyl or aralkyl ester of a hypohalogenous acid in the presence of water. When operating with a hypohalogenous acid, we have discovered that in order to obtain the maximum yield of desired product by obviation of undesirable side reactions, precaution should be exercised so that the unsaturated halide and the reaction product thereof are not permitted to come into contact with free or undissolved halogen.

A convenient method of providing relatively dilute solutions of a hypohalogenous acid consists in dissolving halogen in water and contacting the resulting aqueous halogen solution, substantially devoid of undissolved halogen and preferably in the absence of neutralizing agents, directly with the unsaturated monohalide. To avoid the presence of undissolved halogen, the aqueous solution is preferably prepared in an independent absorbing stage prior to introduction into a reaction stage. When a halogen is dissolved in water, a dynamic equilibrium is established in the solution which may be represented by the reaction $$(Hal)_2 + H_2O \rightleftharpoons Hal \cdot OH + H \cdot Hal.$$

The hydrogen halide present in the solution does not react with the unsaturated monohalide or product formed therefrom at concentrations below about 1.5 normal. Suitable aqueous solutions of a hypohalogenous acid may be prepared in a substantially pure state by any suitable known means, such as, by electrolysis of aqueous solutions of metal halides, by treatment of metal hypohalites with dilute aqueous acid solutions or by the decomposition of organic alkyl hypohalites in aqueous solution, and the hypohalogenous acid solution per se or in the presence of a hydrogen halide contacted with an unsaturated monohalide.

We have found that the optimum concentrations of hydrogen halide and of hypohalogenous acid in the reaction vessel depend on the nature of the reactants as well as on the product desired. Thus to avoid undesirable side reactions leading to saturated halides, we prefer to work with lower hydrogen halide concentrations when treating an unsaturated chloride containing an unsaturated tertiary carbon atom than when the unsaturated chloride does not possess such an unsaturated tertiary carbon atom. For example, when the chloride treated possesses an unsaturated tertiary carbon atom, we prefer to keep the hydrochloric acid concentration at or below 0.7 normal, while with compounds not containing an unsaturated tertiary carbon atom we prefer to operate at or below a maximum hydrochloric acid concentration of 1.5 normal. We also found that we may advantageously employ higher concentrations of hydrochloric than of hydrobromic acid, while with hydroiodic acid the concentration is preferably kept lowest.

We generally keep the concentration of hypochlorous acid or chlorine in the reaction vessel proper below 0.1 normal and we prefer to work at an apparent optimum between 0.005 normal and 0.015 normal. We have found that we may use bromine and iodine and the corresponding hypohalides in considerably higher concentrations without lowering the yield of the desired reaction product.

However, when treating unsaturated halides containing an unsaturated tertiary carbon atom with an aqueous solution of chlorine or hypochlorous acid we found that we can control the relative amounts of useful products formed by regulating the concentration of the chlorhydrinating agent. If we employ concentrations between 0.005 normal and 0.01 normal, we almost exclusively obtain as the reaction product a tertiary alcohol containing one more chlorine than was possessed by the unsaturated halide treated. However, when concentrations of hypochlorous acid or chlorine above 0.01 normal and preferably between 0.015 normal and 0.025 normal are employed, we may obtain as valuable by-products tertiary alcohols containing at least two more chlorine atoms than the original unsaturated halide.

In the event that we desire to execute our process by effecting the reaction of an unsaturated monohalide with an ester of a hypohalogenous acid, we may proceed as follows: the reactants are, in the presence of water, brought into contact in a reaction vessel at temperatures preferably not exceeding about 20° C. The reaction rate and yield of product are materially increased by effecting intimate contact of the reactants as by stirring.

In some instances, it may be of advantage to execute our invention using organic hypohalites. Alkyl hypohalites are much milder agents than the free hypohalogenous acids or halogens, consequently when used they may inhibit the occurrence of undesirable side reactions and give higher yields of halohydrins. If the treated unsaturated halide is relatively expensive this increase in yield of the desired product may out-balance the additional cost of preparation of the alkyl hypohalite.

The general reaction of an organic hypohalite with an unsaturated monohalide in the presence of water to form a polyhalogenated hydroxy compound may be illustrated by the specific reaction of 4-chlorobutene-1 and tertiary butyl hypochlorite whereby 1,4-dichlorobutanol-2 and tertiary butyl alcohol are obtained as the main reaction products. The reaction is represented by the equation:

$$CH_2=CH-CH_2-CH_2Cl + H_2O + (CH_3)_3COCl \rightarrow$$
$$CH_2Cl-CHOH-CH_2-CH_2Cl + (CH_3)_3COH$$

The primary, secondary and tertiary alkyl esters of hypochlorous and hypobromous acids are particularly adaptable to advantageous use in the execution of our process. It is preferable to operate with tertiary esters of hypohalogenous acids as they are more stable than those of primary or secondary character, although it is to be understood that in certain instances, it may be preferable to employ primary or secondary esters of a hypohalogenous acid at relatively low temperatures and with or without the use of inert solvents or stabilizers. If desired, mixed organic hypohalites may be employed and mixed alcohols obtained in solutions, mixtures or suspension with the desired product. The resulting combinations of products may be utilized as such or separation of the constituents may be effected by conventional methods as by distillation, extraction and the like. The nonhalogenated alcohols may be separated from the halogenated product and unreacted monohalide and reutilized, for example, in the preparation of the corresponding organic hypohalites. The unreacted unsaturated monohalide may be recovered and reutilized.

When the process is executed under the preferred conditions of temperature and pressure, the majority of unsaturated monohalides will exist and be reacted in the liquid phase. The unsaturated monohalide is reacted with a hypohalogenous acid or an equivalent reactant by the continuous or intermittent introduction of the reactants to a reaction stage wherein it is desirable that intimate contact be effected as by stirring, efficient countercurrent and the like means. In the majority of cases, we employ hypochlorous acid solutions, preferably prepared by dissolving chlorine in water in the absence of neutralizing agents. Hypochlorous acid solutions may be prepared by contacting gaseous chlorine and water in a suitable absorption tower. It was found that the addition of carbon tetrachloride to the reaction mixture is advantageous in cases where the unsaturated monohalide and resulting products are relatively insoluble in and lighter than water, since by this means inversion of the liquid layers may be effected and the unsaturated monohalide and reaction products more effectively separated from the cycled aqueous solution. In many cases, the operation may be more effectively and efficiently executed by effecting the reaction in the presence of a suitable water insoluble solvent for the reaction product, such a solvent may serve as an extractant agent and remove the reaction product from the circulating aqueous solution. The solvent may be a suitable organic or inorganic substance which may or may not be inert to the reactance and/or reaction products. Suitable solvents which may be employed include hydrocarbons, ethers, esters, alcohols, halogenated hydrocarbons, etc. To avoid the formation of undesirable by-products, it is desirable that the unsaturated monohalide be in excess of the hypohalogenous acid in the reaction chamber. The reaction product, the nature of which is dependent on the type of monohalide reacted, may or may not be soluble in the mixture of reactants. In many instances, the product dissolves in the water which is introduced into the reaction stage with the hypohalogenous acid, in which case the aqueous solution, which may also contain unreacted monohalide and hydrogen halide may be continuously or intermittently withdrawn from the reaction stage and the product separated by suitable means such as by fractionation, extraction, and the like. The unreacted monohalide may be recovered and returned, either in a purified form or in solution or admixture with water, to the reaction stage. When distillation methods are employed, the product may be recovered as a constant boiling mixture comprising water, unreacted monohalide and/or other substances which may be present or added for the purpose of facilitating separation.

Our process may be executed at any desired temperature depending on the stability and character of the reactants employed. In the majority of cases, we prefer to operate at about room temperature. When the unsaturated monohalide and/or reaction product thereof is or are easily oxidized or otherwise undesirably effected at room temperature, it is of advantage to operate at temperatures substantially lower. Moderately elevated temperatures and shorter times of contact of the reactants may be employed when it is of advantage to accelerate the reaction, but we have observed that at higher temperatures undesirable side reactions are favored.

In the majority of cases, it is desirable to operate at atmospheric pressure; however, when warranted by the reactants, temperature and particular operating conditions chosen, subatmospheric or superatmospheric pressures may be employed.

The following examples are introduced for the purpose of illustrating the mode and conditions of operation of our process wherein certain specific reactants are employed.

*Example I*

The process was executed in a cyclic system consisting of a suitable reaction chamber, a separator stage for breaking up emulsions in the liquid leaving the reaction chamber, and an absorption column wherein circulating water was saturated with chlorine and introduced into the reaction chamber.

The system was charged with 7000 c. c. of water, 100 c. c. of carbon tetrachloride and 100 c. c. of isobutenyl chloride

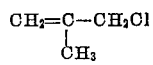

While the liquids were agitated in the reaction chamber and the water caused to circulate through the system, gaseous chlorine was continuously introduced into the lower portion of the countercurrent halogen absorption column at a rate of about 20 to 25 grams of chlorine per hour. Isobutenyl chloride was admitted to the reaction chamber at a rate of about 25 grams per hour. After about 19 hours of continuous operation, a total of 570 grams of isobutenyl chloride and 405 grams of chlorine had been introduced into the system. A small portion of the circulating liquid was then withdrawn and its hydrogen chloride content found to be about 0.07 N. The operation was continued in the same manner as described for about 13 more hours, but water was now admitted to the system at a rate of about 350 to 400 grams per hour so as to maintain the hydrochloric acid concentration substantially constant at 0.07 N. A portion of the circulating liquid, which contains the reaction product in solution, was intermittently withdrawn from the system so as to keep the volume of circulating liquid approximately constant. At the end of 22 hours of continuous operation the run was terminated; during this period of time, a total of 950 grams of isobutenyl chloride and 700 grams of chlorine had been introduced into the system.

The liquid was discharged from the apparatus, mixed with the portions previously withdrawn, and the two liquid phases existing in the mixture separated. The aqueous phase was extracted with ethyl ether, the ether solution combined with the non-aqueous phase and the total mixture fractionated. After the bulk of the ether and carbon tetrachloride had been removed at atmospheric pressure, the pressure in the still was decreased. The main product, amounting to 1150 grams boiled at 70° C. at a pressure of 14.2 mms. and was identified as a symmetrical dichloro tertiary butyl alcohol having the probable formula

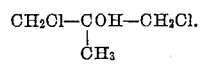

*Example II*

The apparatus employed and the procedure followed was essentially the same as described in Example I.

210 grams of a mixture of isomers of monochlorides of isoamylene boiling at atmospheric pressure in a temperature range of about 92° C. to 100° C. were admitted to the reaction vessel at an average rate of about 35 grams per hour. Chlorine gas was admitted to the halogen absorption stage at a rate of about 25 grams per hour. The entire operation was conducted at room temperature and atmospheric pressure. The operation was discontinued after about 5.5 hours, during which time a total of 210 grams of isoamylene monochlorides and 130 grams of chlorine had been admitted to the system.

The liquid was withdrawn from the system and extracted with ethyl ether. The ether solution was fractionated. About 250 grams of a mixture of dichloro tertiary amyl alcohols were collected. The mixture was found to consist of the following isomers:

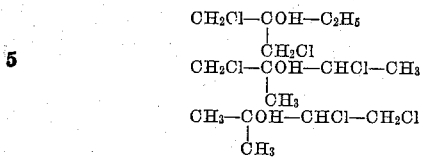

Example III 261.3 grams of isopentenyl chloride.

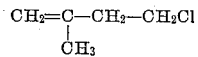

were placed in a flask and 4 liters of a 0.5 N solution of hypochlorous acid were slowly added while the reactants were rapidly stirred. When all of the hypochlorous acid had reacted, the mixture was extracted with ether. The ether solution was dried and the ether removed by distillation at atmospheric pressure. The residue was fractionated under a reduced pressure.

The product, a dichloro tertiary amyl alcohol having the probable formula

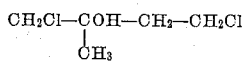

was obtained in a yield of 90%.

Example IV

The apparatus as used in Example I was charged with 135 grams of crotyl bromide

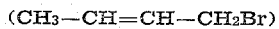

and 5000 c. c of water. The mode of operation was essentially the same as described in Example I except that in the present instance no solvent such as carbon tetrachloride was employed. Crotyl bromide was added at a rate of about 57 grams per hour while chlorine was admitted to the system at a rate of about 30 grams per hour. The operation, which was conducted at room temperature and atmospheric pressure, was discontinued when a total of 1400 grams of crotyl bromide had been admitted.

The product was recovered by extraction followed by distillation of the extractant solution. 1600 grams of product identified as mainly 1-bromo-3 chloro-butanol-2 were obtained. The isomeric 1-bromo-2 chloro-butanol-3 was also present.

Example V 216 grams of tertiary butyl hypochlorite and 2.5 liters of water were added to 200 grams of isobutenyl chloride in a flask equipped for rapid stirring of the contents. By suitable cooling means, the reaction temperature was maintained at about 18 to 22° C. In about one hour's time, it was assumed that the reaction had gone to completion. The watery liquid was extracted with ether and the ether solution fractionated. The ether, unreacted isobutenyl chloride and some tertiary butyl alcohol were removed by distillation at atmospheric pressure. The fractionation of the residue was continued under a decreased pressure.

The product which boils at about 70° C. at 14.2 mm. was 1,3-dichloro-2 methyl propanol-2. The yield was about 95% of the theoretical.

Example VI

The process was executed in a cylic system consisting of a glass lined 60 gallon reaction vessel, a separator stage for effecting separation of the circulating aqueous solution and non-aqueous liquid phase comprising unreacted isobutenyl chloride and reaction products and an absorption stage wherein the circulating water was saturated with chlorine and introduced into the reaction chamber. The liquid was circulated through the system by means of a hard-rubber pump.

The reaction vessel was charged with water and isobutenyl chloride. The liquids were agitated in the reaction vessel by a suitable wooden stirrer and liquid was caused to circulate through the chlorine absorption stage wherein it was counter-currently contacted with gaseous chlorine. The aqueous solution entering the reaction vessel contained about 0.21 mols of hypochlorous acid per gallon. The rate of this feed was adjusted so that the average hypochlorous acid concentration in the reaction vessel was maintained around 0.02 normal. Isobutenyl chloride was continuously admitted to the reaction vessel at a rate sufficiently high to maintain an excess of isobutenyl chloride over hypochlorous acid. The progress of the reaction was checked from time to time by withdrawing a portion of the circulating liquid and determining its hydrogen chloride content. When the hydrogen chloride concentration reached about 4%, some of the circulating liquid was withdrawn and replaced by an equivalent volume of water, thus keeping the hydrogen chloride concentration at or below about 2.5% and the volume of liquid in the system substantially constant at about 60 gals.

A total of about 52.7 kilos of isobutenyl chloride and 110 gallons of water were admitted to the system during the operation. On termination of the run, the liquid was discharged from the system, allowed to stratify and the two liquid phases separated. The aqueous phase which contained some of the reaction product in solution was utilized, without effecting separation of the constituents, for the production of the corresponding epichlorhydrin. The non-aqueous phase was distilled under reduced pressure. The main reaction product, dichloro tertiary butyl alcohol

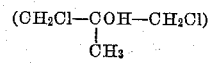

was obtained in a yield of about 65%, partly as epichlorhydrin from the aqueous layer and partly as a cut boiling at 70° C. under a pressure of 14 mm. of mercury. Another cut recovered in the same distillation, which boiled at 90° C. under 4 mm. of pressure was identified as trichloro-tertiary butyl alcohol of the probable formula

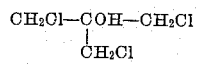

and amounted to a yield of 15% of the theoretical. The rest of the products were mainly tri- and tetra-chlorides as well as some aldehydic substances.

The above described mode of operation or suitable modification thereof provides a means for the technical scale production of polyhalogenated carbinols.

Example VII 284 grams of monochloro diisobutylene of the probable formula

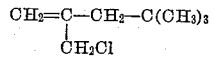

and 2500 c. c. of water were stirred in a flask and 2.12 mols of gaseous chlorine slowly added. When the reaction was complete, the aqueous reaction mixture was allowed to stratify and the two liquid phases separated. The hydrogen chloride content of the aqueous phase was found to be about 2.2 mols. The non-aqueous layer was fractionated.

The main reaction product boiled between 97° C. and 113° C. at a pressure of about 30 to 35 mm. of mercury. Analysis of the product showed it to have the composition:

|  | Per cent |
|---|---|
| Carbon | 53.1 |
| Hydrogen | 7.2 |
| Chlorine | 39.7 |

These results indicate a compound of the formula $C_8H_{14}Cl_2$. It was evident that the main reaction was substitution of halogen for hydrogen in the molecule. No trace of chloro alcohol was found.

Our process is adaptable to batch, intermittent or cyclic operation. The reaction may be effected in one or a plurality of communicating stages. When solutions of halogen and water are employed, the solutions are preferably effected in one or more separate absorption stages. The aqueous solution cycled through the reaction and absorption stages, and in many cases containing reaction products and unreacted unsaturated monohalide, may be continuously withdrawn from the system and conducted to a suitable apparatus wherein the separation of the product is effected by any suitable conventional means and the unreacted unsaturated monohalide and aqueous solution of hydrogen halide may be conducted back to the system for reutilization therein.

In certain cases where unsaturated monohalides are available in solutions or mixtures comprising more than one species or type of unsaturated monohalide, such solutions or mixtures may be utilized for solvent purposes, as intermediates, etc., without resorting to separation of the constituents, or the products may be separated by any suitable means such as fractionation, stratification, extraction, etc.

The products obtained in our process may be used as solvents in numerous extraction, purification, recovery and refining processes, such as for refining of mineral oils, purification of refinery and manufactured gases, etc. The polyhalogenated tertiary alcohols are particularly useful as raw materials for the preparation of unsaturated aldehydes and ketones for use in the manufacture of resins, perfumes, essences and the like. The polyhalogenated tertiary alcohols are also useful as raw materials for the preparation of polyhydric alcohols and derivatives such as oxides, ethers, esters and the like.

While we have in the foregoing described in some detail the preferred embodiment of our invention and some variants thereof, it will be understood that this is only for the purpose of making the invention more clear and that the invention is not to be regarded as limited to the details of operation, nor is it dependent on the soundness or accuracy of the reasons advanced for the advantageous results obtained. On the other hand, the invention is to be regarded as limited only by the terms of the accompanying claims, in which it is our intention to claim all novelty inherent therein as broadly as possible in view of the prior art.

We claim as our invention:

1. A process for the treatment of unsaturated monohalides which comprises effecting the reaction of an unsaturated monohalide containing at least four carbon atoms, an olefinic linkage between two aliphatic carbon atoms, and the halogen atom linked to a saturated carbon atom with a reactant of the class consisting of an aqueous solution of a hypohalogenous acid, a preformed aqueous solution of a halogen in the substantial absence of undissolved halogen, and an aqueous mixture of an organic hypohalite containing an alkyl group contiguous to the hypohalite radical.

2. A process for the treatment of unsaturated monohalides which comprises effecting the reaction of an unsaturated monohalide containing an olefinic linkage between two aliphatic carbon atoms, at least four carbon atoms and the halogen atom linked to a saturated carbon atom with a hypohalogenous acid in the substantial absence of a free halogen.

3. A process for the treatment of unsaturated monohalides which comprises effecting the reaction of an unsaturated monohalide containing an olefinic linkage between two aliphatic carbon atoms, at least four carbon atoms and the halogen atom linked to a saturated carbon atom with an aqueous solution of halogen substantially devoid of undissolved halogen.

4. A process for the treatment of unsaturated monohalides which comprises effecting the reaction of an unsaturated monohalide containing an olefinic linkage between two aliphatic carbon atoms, at least four carbon atoms and the halogen atom linked to a saturated carbon atom with an aqueous mixture of an organic hypohalite containing an alkyl group contiguous to the hypohalite radical.

5. A process for the treatment of unsaturated monohalides which comprises effecting the reaction of an unsaturated monohalide containing an olefinic linkage between two aliphatic carbon atoms, at least four carbon atoms embraced in a normal alkyl chain and the halogen atom linked to a saturated carbon atom with an aqueous solution of a halogen in the substantial absence of undissolved halogen and wherein the hydrogen halide concentration does not exceed about 1.5 normal.

6. A process for the treatment of unsaturated monohalides which comprises effecting the reaction of an unsaturated monohalide containing an olefinic linkage between two aliphatic carbon atoms, at least four carbon atoms embraced in a normal alkyl chain and the halogen atom linked to a saturated carbon atom with an aqueous mixture of an organic hypohalite containing an alkyl group contiguous to the hypohalite radical.

7. A process for the treatment of unsaturated monohalides which comprises effecting the reaction of an unsaturated monohalide containing an olefinic linkage between two aliphatic carbon atoms, at least four carbon atoms embraced in a normal alkyl chain and the halogen atom linked to a saturated carbon atom with a hypohalogeneous acid in the absence of neutralizing agents and free halogen.

8. A process for the treatment of unsaturated monohalides which comprises effecting the reaction of an unsaturated monohalide containing at least four carbon atoms and an olefinic linkage between two aliphatic carbon atoms one of which is tertiary and a halogen atom attached to a saturated carbon atom with a preformed aqueous solution of halogen in the substantial absence of undissolved halogen.

9. A process for the treatment of unsaturated monohalide which comprises effecting the reaction of an unsaturated monohalide containing an olefinic linkage between two aliphatic carbon atoms one of which is tertiary and a halogen atom attached to a saturated carbon atom with a hypohalogenous acid in the substantial absence of free halogen.

10. A process for the treatment of unsaturated monohalides which comprises effecting the reaction of an unsaturated monohalide containing an olefinic linkage between two aliphatic carbon atoms at least one of which is tertiary and a halogen atom attached to a saturated carbon atom in an isoalkyl chain with a hypohalogenous acid in the substantial absence of free halogen.

11. A process for the treatment of unsaturated monohalides which comprises effecting the reaction of an unsaturated monohalide containing an olefinic linkage between two aliphatic carbon atoms, a tertiary carbon atom in an iso alkyl chain and a halogen atom attached to a saturated carbon atom with a hypohalogenous acid in the substantial absence of free halogen.

12. A process for the production of 1,3-dichloro-2 methyl propanol-2 of the formula

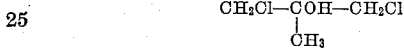

which comprises effecting the reaction of isobutenyl chloride with a hypochlorous acid.

13. A process for the production of 1-bromo-3 chloro butanol-2 which comprises effecting the reaction of crotyl bromide with a hypochlorous acid.

14. A process for the treatment of an unsaturated monohalide which comprises reacting an aliphatic unsaturated monohalide containing an alkyl chain of at least four carbon atoms two of which are joined by an olefinic linkage, and a halogen atom linked to a saturated carbon atom of said chain, with a hypohalogenous acid in the substantial absence of a free halogen.

15. A process for the treatment of an unsaturated monohalide which comprises reacting an unsaturated monohalide containing an alkyl chain of at least four carbon atoms two of which are joined by an olefinic linkage, a carbon atom of said chain linked to less than three other carbon atoms and once removed from an unsaturated carbon atom, and the halogen atom linked to a saturated carbon atom, with a preformed aqueous solution of a halogen in the substantial absence of undissolved halogen and wherein the hydrogen halide concentration does not exceed about 1.5 normal.

16. A process for the treatment of unsaturated halides which comprises reacting an unsaturated monohalide containing at least four carbon atoms, an olefinic linkage between two aliphatic carbon atoms and the halogen atom linked to a saturated carbon atom, with an aqueous mixture of an alkyl hypohalite.

17. A process for the treatment of unsaturated halides which comprises reacting an unsaturated monohalide containing at least four carbon atoms, an olefinic linkage between two aliphatic carbon atoms and the halogen atom linked to a saturated carbon atom, with tertiary butyl hypochlorite in the presence of water.

HERBERT P. A. GROLL.
GEORGE HEARNE.